United States Patent [19]

Sekiya et al.

[11] Patent Number: 5,255,134
[45] Date of Patent: Oct. 19, 1993

[54] AUTO-TRACKING SYSTEM FOR MAGNETIC RECORDING/REPRODUCING APPARATUS

[75] Inventors: Masataka Sekiya; Kiyoshi Hiramatsu; Hideyuki Usami; Hisashi Ohta, all of Ibaraki, Japan

[73] Assignee: Hitachi, Ltd., Tokyo, Japan

[21] Appl. No.: 700,843

[22] Filed: May 16, 1991

[30] Foreign Application Priority Data

May 18, 1990 [JP] Japan ................. 2-126688

[51] Int. Cl.$^5$ ............... G11B 15/467; G11B 21/04
[52] U.S. Cl. .................. 360/70; 360/73.07; 360/77.13; 358/321; 358/338
[58] Field of Search .......... 360/70, 73.07, 77.13; 358/321, 338

[56] References Cited

U.S. PATENT DOCUMENTS

| | | | |
|---|---|---|---|
| 3,845,500 | 10/1974 | Hart | 360/77.13 |
| 4,210,943 | 1/1980 | Nakamura et al. | 360/70 |
| 4,255,768 | 3/1981 | Kubota | 360/77.13 |
| 4,607,298 | 8/1986 | Yamashita | 360/73.07 |
| 4,920,435 | 4/1990 | Yamazaki | 360/70 |
| 5,119,246 | 6/1992 | Tomitaka | 360/70 |

Primary Examiner—John Zazworsky
Attorney, Agent, or Firm—Antonelli, Terry, Stout & Kraus

[57] ABSTRACT

An auto-tracking system for a helical scan type magnetic recording/reproducing unit comprises a synchronizing signal separating circuit from video signals on a running magnetic tape reproduced by a rotary video head, a periodicity variation measuring and comparing circuit in the synchronizing signals separated in the synchronizing signal separating circuit, and a tracking control means which controls the running condition of the magnetic tape with reference to a phase difference between a reference signal in association with the rotary video head and a signal representing the running condition of the magnetic tape and changes tracking by a predetermined amount in response to the periodicity variation measured by the measuring and comparing circuit so as to minimize the periodicity variation measured by the same, thereby an optimum tracking position is obtained without being interfered by cross-talks between the adjacent tracks.

9 Claims, 5 Drawing Sheets

AUTO-TRACKING SYSTEM FOR MAGNETIC RECORDING/REPRODUCING APPARATUS

BACKGROUND OF THE INVENTION

The present invention relates to an auto-tracking system for a helical scan type magnetic recording/reproducing apparatus which necessitates tracking adjustment during reproduction.

One of conventional auto-tracking system for helical scan type magnetic recording/reproducing apparatus is disclosed in U.S. Pat. No. 4,613,914.

In the conventional arrangement disclosed in this patent, an envelope level of reproduced signal is detected and the running phase of magnetic tape is controlled such that the envelope level of the reproduced signal becomes maximum after detection is effected roughly and then finely.

For high density recording using azimuthal recording method employed in a home-use video tape recorder (VTR) of VHS or Beta type, and, particularly, in a long time mode of operation thereof, however, there arises a problem in accuracy of auto-tracking because the envelope level is greatly affected by cross-talks between adjacent tracks.

SUMMARY OF THE INVENTION

An object of the present invention is to provide an auto-tracking system for a helical scan type magnetic recording/reproducing apparatus, which achieves an optimum tracking with minimum jitter, without being affected by cross-talks between adjacent tracks on a recording medium.

In order to achieve the above object, according to the present invention, the fluctuation of periodicity of a synchronizing signal obtained by demodulating an FM envelope signal is measured and the tracking is adjusted automatically by varying tracking phase such that the measured periodicity fluctuation becomes minimum.

In a reproduction in a reverse tracking, it is impossible to know a direction of tracking correction since no synchronizing signal is detected, even if tracking is changed slightly.

In such case, according to the present invention, the technique disclosed in the aforementioned U.S. Patent is employed to roughly adjust the tracking by using the FM envelope level and, after a synchronizing signal is detected, the tracking is adjusted in a direction in which the periodicity fluctuation is minimized.

Alternatively, the tracking phase is varied in only either direction from the minimum of a variable tracking phase range to maximum or from maximum to minimum until a synchronizing signal is detected, and, after detected, the tracking is adjusted in the direction in which the periodicity fluctuation reduces, in the same manner as above. That is, according to the present invention, synchronizing signal is obtained from video signal reproduced by a rotary video head and a periodicity fluctuation of the synchronizing signal is measured, upon which the tracking is automatically adjusted. Thus, an optimum tracking is obtained without any interference due to cross-talks between adjacent tracks.

DETAILED DESCRIPTION OF THE PREFERRED EMBODIMENTS

Figure 1:
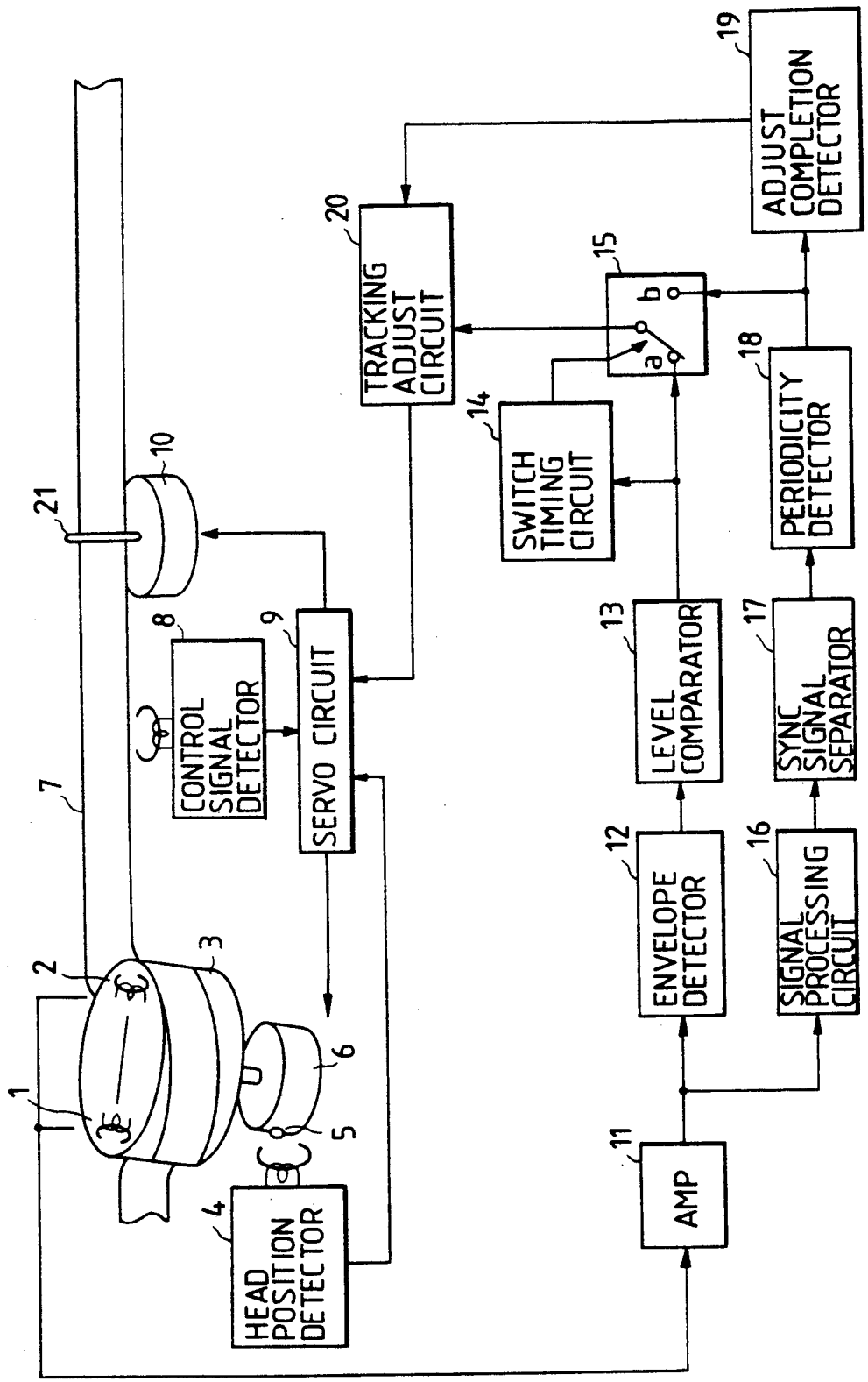
FIG. 1 is a block circuit diagram of an automatic tracking system according to an embodiment of the present invention.

An embodiment of the present invention will be explained with reference to FIG. 1. In FIG. 1, reference numerals 1 and 2 indicate rotary video heads, 3 a cylinder on which the heads 1 and 2 are mounted, 4 a head position or phase detector, 5 a magnet, 6 a cylinder motor mounting the magnet 5, 7 a magnetic tape, 8 a control signal detector, 9 a servo circuit, 10 a capstan motor, 11 an amplifier, 12 an FM envelope signal detection circuit, 13 a level comparator circuit, 14 a switch timing circuit, 15 a switch, 16 a signal processing circuit, 17 a synchronizing signal separation circuit, 18 a periodicity detection circuit, 19 a circuit for determining a completion of tracking adjustment, 20 a tracking adjust circuit, and 21 a capstan motor shaft.

The rotary video heads 1 and 2 with different azimuth angles from each other are arranged on the rotatable cylinder 3 with a phase difference of 180° to alternatively record signals on or reproduce signals from the magnetic tape 7. An axis of the rotary shaft of the cylinder 3 is common with that of the cylinder motor 6, so that the cylinder 3 rotates together with the shaft of the cylinder motor 6. The cylinder motor 6 is controlled by the servo circuit 9. The magnet 5 is actually located on the cylinder motor shaft although it is shown on the motor 6 for illustration purpose, so that it rotates in synchronism with the rotary video heads 1 and 2. When the magnet 5 passes through the head position detector 4, the head position detector 4 generates an electrical signal which represents rotational phases of the rotary video heads 1 and 2 and is supplied to the servo circuit 9 to control the rotational phase of the cylinder motor 6.

The servo circuit 9 is further supplied with a control signal from the control singal detector 8 to drive the capstan motor 10 at a constant speed. The magnetic tape 7 is in pressure-contact with the capstan motor shaft 21 with an aid of a pinch roller not shown and runs by a distance proportional to a rotation number of the capstan motor shaft 21.

As mentioned, the control signal detector 8 reproduces control signals recorded on the magnetic tape 7 by the rotary video head 1 or 2 to indicate track position.

During recording, the servo circuit 9 controls the capstan motor 10 so as to rotate at a predetermined constant speed and, during reproduction, controls the phase of the magnetic tape 7 through the capstan motor 10 and the capstan motor shaft 21 by using the control signals detected at the control signal detector 8, so that the phase relationship between the rotary video heads 1 and 2 and the magnetic tape 7 at the time of recording can be recovered.

When the apparatus used for recording is identical to that used for reproduction, no problem arises with regard to the reproduction. When these apparatus are not identical, the phase relationship between the rotary video heads 1 and 2 and the magnetic tape 7 during the recording is not always consistent with that during the reproduction because the physical positional relationship between the rotary video heads 1 and 2 and the control signal detector 8 may be different. Therefore, in order to electrically compensate for such physical positional displacement, the phase relationship between the rotary video heads 1 and 2 which are controlled by the cylinder motor 6 and the magnetic tape 7 which is controlled by the capstan motor 10 through the capstan motor shaft 21 is varied by the tracking adjust circuit 20 to obtain an optimum reproduction tracking.

An operation for obtaining the above mentioned optimum reproduction tracking will be explained below.

It is assumed that the tracking adjust circuit 20 varies the phase relationship between the rotary video heads 1 and 2 and the magnetic tape 7 in a direction in which tracking amount expressed by numeral value is increased, that is, a (+) direction with respect to the optimum tracking during recording or reproducing.

The FM modulated signals reproduced at the rotary video heads 1 and 2 are amplified at the amplifier 11. The FM envelope signal detection circuit 12 detects peaks of the FM modulated signals from the amplifier 11 and converts the detected signal peak levels into electrical voltages. The voltage amplitude is compared at the level comparison circuit 13 with that detected at one field or one frame prior thereto. This comparison result is output to the switch timing circuit 14 and the switch 15 controlled by the switch timing circuit 14. In the initial condition of the present system, the switch 15 is assumed to be connected to the terminal a so that an output of the level comparison circuit 13 is inputted into the tracking adjust circuit 20.

The tracking adjust circuit 20 controls the servo circuit 9 in such a manner that when the output of the level comparison circuit 13 is large with respect to an optimum tracking the tracking is varied in the (+) direction and when such is small the tracking is varied in a (−) direction.

The same operations are repeated. When the output of the level comparison circuit 13 alternates large and small with respect to the optimum tracking every time when the tracking amount is varied, it is deemed that a tracking condition in which the output obtained from the rotary video heads 1 and 2 is maximized is obtained and, then, the switch 15 is changed-over from the terminal a to a terminal b by the switch timing circuit 14.

Further, assuming that the tracking is again varied in the (+) direction by the tracking adjust circuit 20, the output signal of the amplifier 11 is demodulated at the signal processing circuit 16, from which the synchronizing signal separation circuit 17 separates the synchronizing signals. The periodicity detection circuit 18 measures the periodicity of the synchronizing signals obtained by the synchronizing signal separation circuit 17, detects a variation of the synchronizing signal within the same field and compares the same with a variation of the synchronizing signal obtained in the prior field or the prior frame. The variation is expressed by one of arbitrary 2 values, large and small with respect to the prior variation, and is output to the tracking adjust circuit 20 through the switch 15. In a case when the variation is large with respect to the prior variation, however, an output polarity of the tracking adjust circuit 20 is made correspondent with that of the level comparison circuit 13 providing a small result and, when the variation is small, the output polarity of the tracking adjust circuit 20 is made correspondent with that of a large result of the level comparison circuit 13. Accordingly, when the periodicity detection circuit 18 detects the small variation in periodicity of the synchronizing signal, the tracking adjust circuit 20 changes the tracking direction to the (+) direction and, when the periodicity detection circuit 18 detects the large periodicity variation, the tracking adjust circuit 20 changes the tracking direction to the (−) direction. Namely, when the periodicity variation in a present detection is small, the tracking correction is made in the same as direction in the previous tracking correction and, when the periodicity variation is large, the tracking direction is made opposite to the previous tracking correction.

The above operations are repeated. When the periodicity variation at the periodicity detection circuit 18 begins to alternate between large and small or no substantial difference is observed in the periodicity variation every time when the tracking amount is varied, the fluctuation of periodicity of the synchronizing signals is minimized. This fact is determined by the adjust completion detector 19 as an optimum tracking condition in which jitter is minimum, and the detector circuit 19 causes the tracking adjust circuit 20 to terminate the tracking correction.

With the above series of operations, an optimum tracking condition is automatically obtained.

The construction and operation of the periodicity detection circuit 18 will be explained in further detail with reference to FIG. 2.

Figure 2:
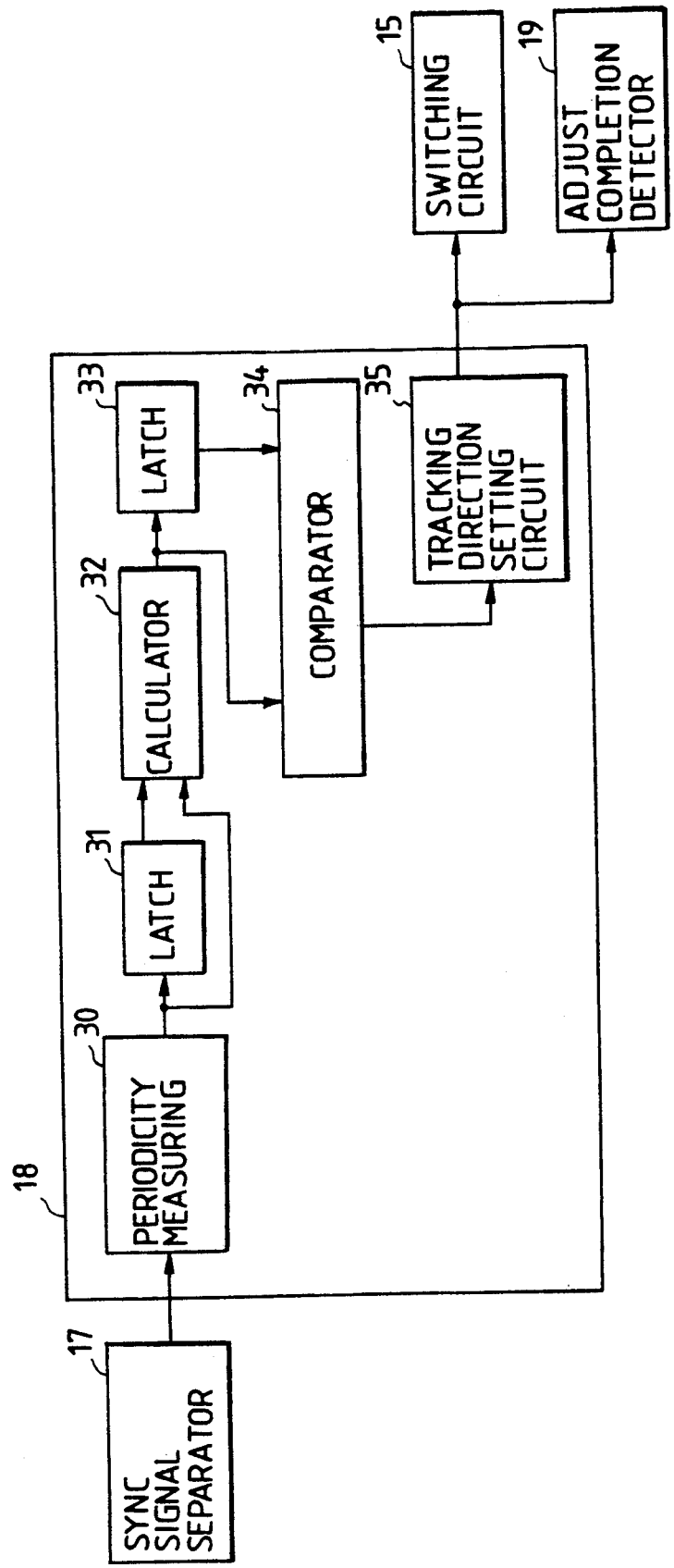
FIG. 2 is a block circuit diagram showing details of a periodicity detection circuit in FIG. 1.

In FIG. 2 in which the same elements are designated with the same reference numerals as in FIG. 1, respectively, a reference numeral 30 denotes a periodicity measuring circuit, 31 and 33 latches, 32 a calculator, 34 a level comparison circuit and 35 a tracking direction setting circuit.

The periodicity measuring circuit 30 measures the periodicity of synchroniziang signals detected at the synchronizing signal separation circuit 17. The measured data is stored in the latch 31 and is further inputted in the calculator 32. The latch 31 outputs the data after a predetermined time delay corresponding to one horizontal synchronizing signal period. The calculator 32 calculates a difference between the data from the periodicity measuring circuit 30 and from the latch 31, from which the periodicity variation in the synchronizing signals is detected. The calculation result is inputted to both the level comparison circuit 34 and the latch 33. The latch 33 receives the calculated data and outputs it with a delay of the same period as that for the tracking change by the tracking adjustment circuit 20 as explained above. The period of the tracking modification (the delay time of the latch 33) is determined by using one field or one frame as a unit. The level comparison circuit 34 compares the output magnitude of the calculator 32 with that of the latch 33 and calculates the periodicity variation in the synchronizing signals before and after a modification of tracking. When the level comparison circuit 34 results that the periodicity variation is small, the tracking direction setting circuit 35 determines the direction of the tracking correction as the same as in the previous correction and, when the periodicity variation is large, the tracking direction setting circuit 35 determines the direction of the tracking correction as being opposite to that in the previous correction. The determination is supplied to the tracking adjust circuit 20 through the switch 15.

The calculator 32 in the above embodiment may calculate a difference in one horizontal synchronizing signal period or may calculate an average value by summing up differences in several horizontal synchronizing signal periods.

Further, when a comparison result in the level comparison circuit 34 shows an equality between the outputs from the calculator 32 and from the latch 33 or shows a difference which is as small as negligible detection errors, the same direction of tracking correction as in the previous correction is selected to accommodate to a marginal value of the optimum tracking, noises or measurement errors.

Another embodiment of the present invention will be explained with reference to FIG. 3.

Figure 3:
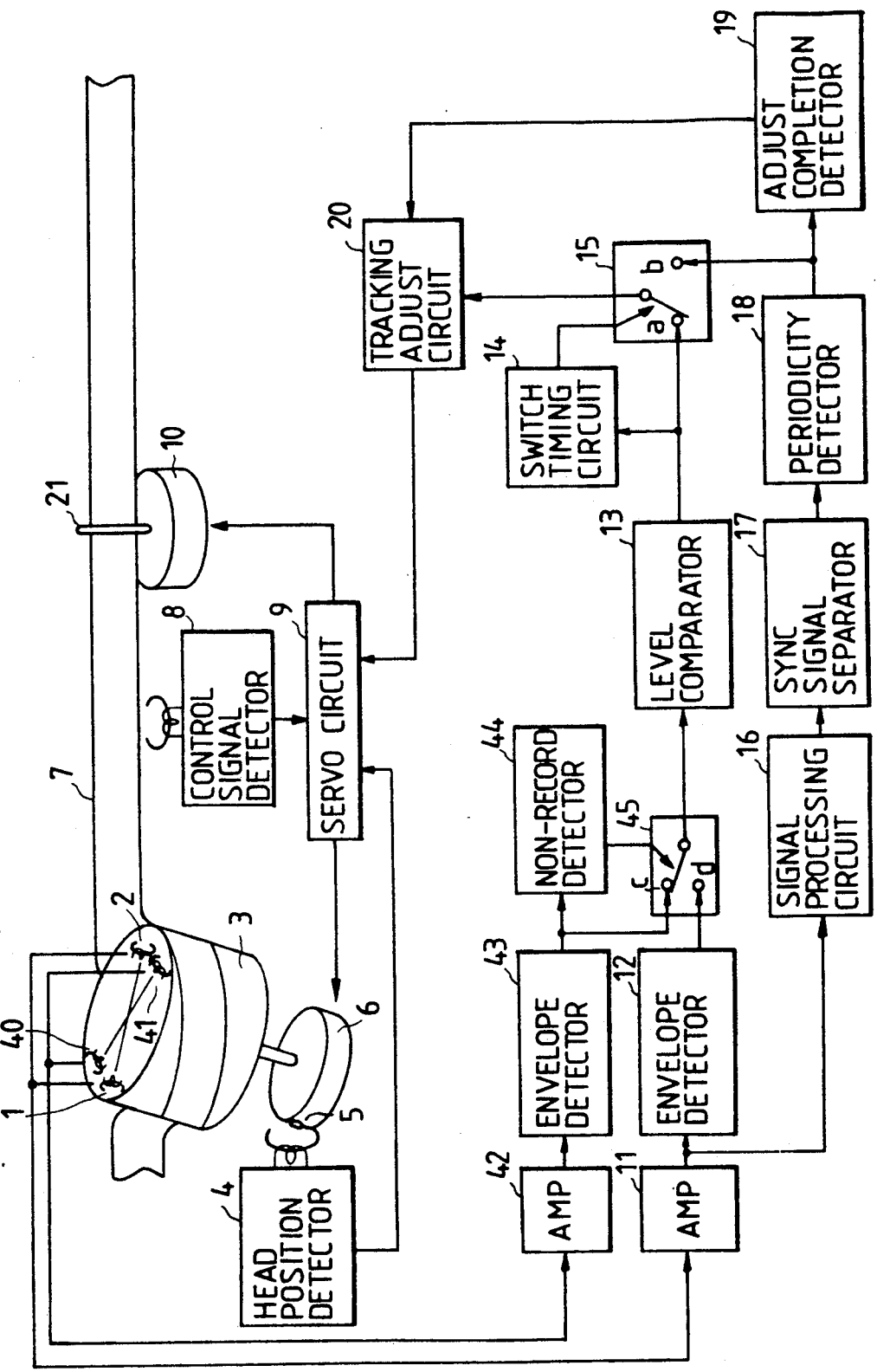
FIG. 3 is a block circuit diagram of another embodiment of the present invention.

In FIG. 3 in which the elements having the same functions as those in FIG. 1 are designated with the same reference numerals as in FIG. 1, reference numerals 40 and 41 depict rotary audio heads, 42 an amplifier, 43 an FM envelope signal detection circuit, 44 a non-recording circuit, and 45 a switch.

The audio FM modulated signals recorded on the magnetic tape 7 are reproduced via the rotary audio heads 40 and 41, amplified at the amplifier 42 and peak-detected at the FM envelope signal detection circuit 43. An output signal from the FM envelope signal detection circuit 43 indicates the level of reproduced audio FM modulated signal which corresponds to the detection of the output level of the rotary video heads 1 and 2 as voltage signals at the FM envelope signal detection circuit 12 as explained previously.

The non-recording circuit 44 detects an absence of FM modulated audio signal when voltage level at the FM envelope signal detection circuit 43 is lower than a predetermined level even if the tracking is modified by the tracking adjust circuit 20, and the circuit 44 controls the switch 45 to change-over itself to a terminal d. When the voltage level at the FM envelope circuit 43 exceeds the predetermined level the non-recording circuit 44 decides a presence of audio FM modulated signals recorded and changes-over the switch 45 to a terminal c.

When the switch 45 is connected to the terminal d, an optimum tracking is automatically obtained through the same series of operations as explained in connection with the above embodiment in FIG. 1.

Further, output signal of the FM envelope signal detection circuit 43 obtained when the switch 45 is connected to the terminal c functions similarly to that of the FM envelope signal detection circuit 12 since operation on the FM modulated video signal is merely replaced with the operation on the FM modulated audio signals. Thus, it is possible to obtain an optimum tracking automatically as in the same manner as in the previous embodiment.

Figure 4:
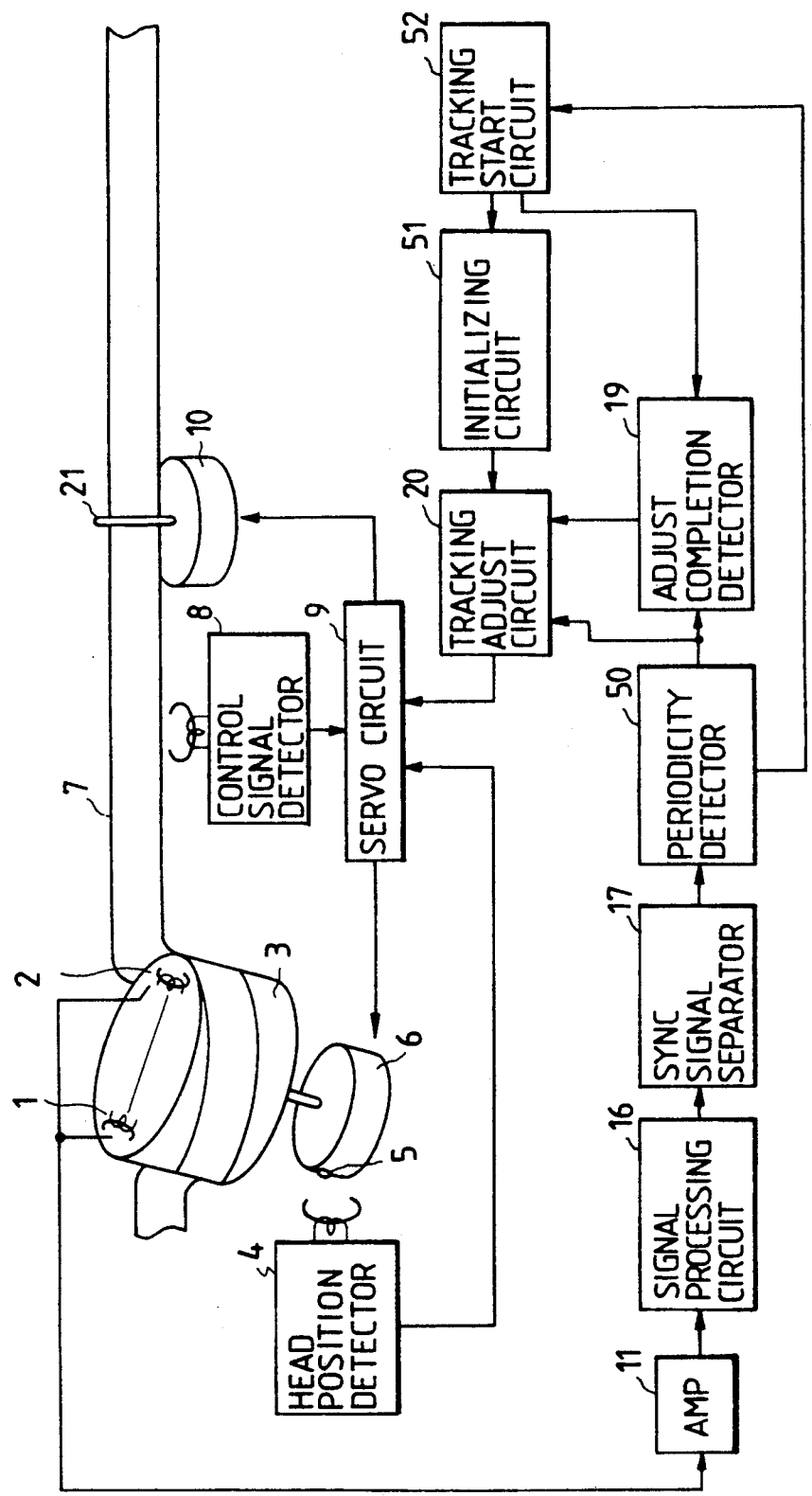
FIG. 4 is a block circuit diagram of a still further embodiment of the present invention.

Still another embodiment of the present invention will be explained with reference to FIG. 4. In FIG. 4, in which the elements having the same functions as those in FIGS. 1 and 3 are designated with the same reference numerals as in FIGS. 1 and 3, a reference numeral 50 indicates a periodicity detection circuit, 51 an initializing circuit and 52 a tracking start circuit.

When the magnetic tape 7 is newly loaded and a reproduction is started or when the state of the reproduced signal at the periodicity detection circuit 50 changes from one indicating that there is a synchronizing signal contained in the reproduced signal to one indicating that there is no synchronizing signal contained therein, the tracking start circuit 52 generates a command signal to the initialization circuit 51 and the tracking adjust completion circuit 19 to initialize a tracking value in the tracking adjust circuit 20 and the tracking adjust completion circuit 19. The initialization values in this initializing step is determined at the maximum or the minimum value of the variable tracking range.

The servo circuit 9 begins to operate with the data signals from the initialized tracking adjust circuit 20 and the rotary video heads 1 and 2 begin to reproduce video signals recorded on the magnetic tape 7. A synchronizing signal is separated from the reproduced video signal by the separation circuit 17 through the amplifier 11 and the signal processing circuit 16.

The periodicity detection circuit 50 determines a presence or absence of the synchronizing signal through the periodicity measurement of the synchronizing signal.

When the presence of the synchronizing signals is determined, the tracking adjust circuit 20 operate so as to minimize the synchronizing signal fluctuation at the periodicity detection circuit 50.

When the absence of synchronizing signal is determined, the tracking is changed in one direction in the tracking adjust circuit 20 until the synchronizing signals is detected. The one direction in this instance means a direction toward the minimum value when the initial tracking value set by the tracking adjustment circuit 20 is at the maximum value within the variable tracking range, or a direction toward the maximum value when the initial tracking value is set at the minimum value in the range. The above operation eliminates such condition that the correcting direction of tracking can not be determined when no synchronizing signals are detected due to the fact that a periodicity fluctuation in the synchronizing signal does not contain any change even if the tracking amount is varied.

Figure 5:
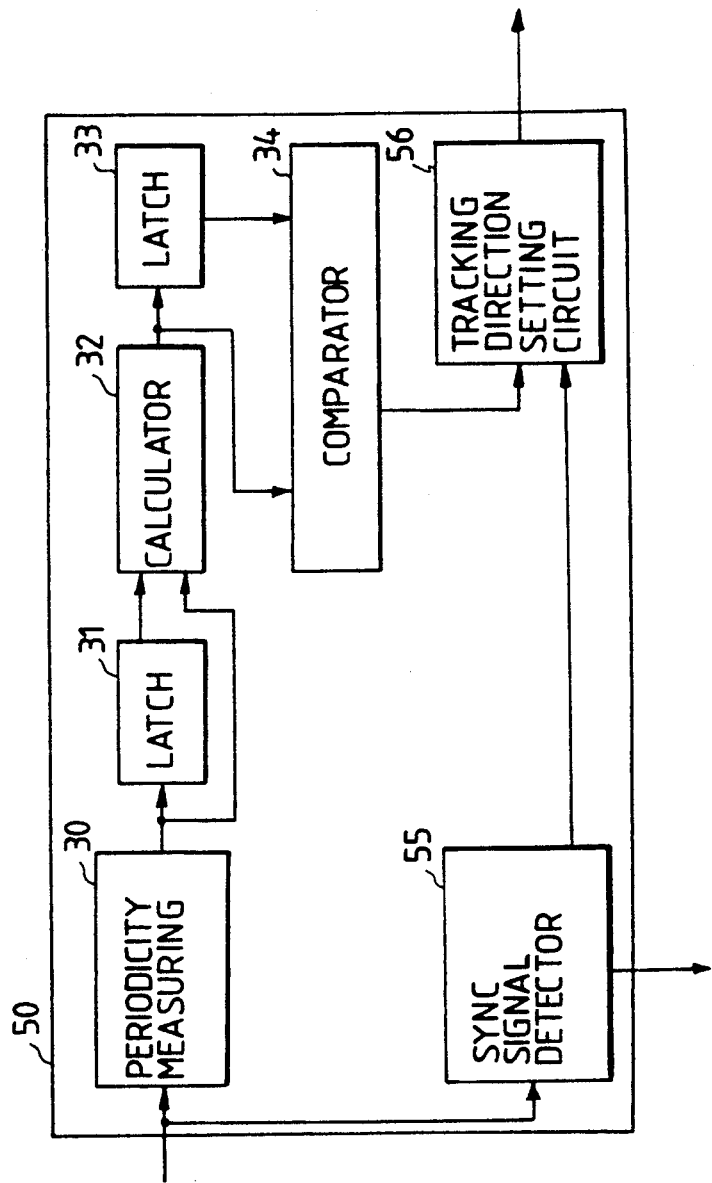
FIG. 5 is a block circuit diagram showing details of a periodicity detection circuit in FIG. 4.

FIG. 5 shows a detailed block circuit diagram of the periodicity detection circuit 50. In FIG. 5, in which the elements having the same functions as those in previous embodiments are designated with the same reference numerals as in the previous embodiments, a reference numeral 55 indicates a synchronizing signal detecting circuit, and 56 a tracking direction setting circuit.

The synchroniziang signal detecting circuit 55 measures the period of synchronizing signal and, when the synchronizing signals are detected regularly within a time of few microseconds of a standard period defined in NTSC or PAL standard, it is determined that there are synchronizing signals. When an abnormally short or long period compared with such time as few microseconds is measured, it is determined to be noise and the synchronizing signals are determined to be absent. In the latter case, the tracking direction setting circuit 56 is fixed to the correcting direction of tracking.

What is claimed is:

1. An auto-tracking system of a helical scan type magnetic recording/reproducing apparatus in which a run of a magnetic tape is controlled by a signal representative of a phase difference between a reference signal and a signal indicative of a running phase of said magnetic tape, comprising:

first means for separating a synchronizing signal from a video signal reproduced by rotary heads of said apparatus;

second means for successively measuring periodicity of said synchronizing signal of said video signal obtained in a field or frame and comparing the measured periodicity with a periodicity measured for a preceding field or frame to provide a variation of periodicity of said synchronizing signal;

servo means responsive to said signal representative of said phase difference for controlling a running state of said magnetic tape; and tracking adjust means responsive to said periodicity comparison in said second means for causing said servo means to successively change tracking by a predetermined amount such that the periodicity variation measured by said second means is minimized.

2. The auto-tracking system claimed in claim 1, further comprising third means for disabling said tracking adjust means when said periodicity comparison in said second means indicates an equality.

3. The auto-tracking system claimed in claim 2, further comprising tracking start means responsive to an output of said second means indicative of disappearance of synchronizing signal for initialize said tracking adjust means and said third means.

4. The auto-tracking system claimed in claim 2 or 3, wherein said tracking adjust means causes said servo means to change said phase difference by a predetermined amount in a direction from the minimum value of a predetermined variable range thereof to the maximum value.

5. The auto-tracking system claimed in claim 2 or 3, wherein said tracking adjust means causes said servo means to change said phase difference by a predetermined amount in a direction from the maximum value of a predetermined variable range thereof to the minimum value.

6. The auto-tracking system claimed in any of claims 1 to 3, wherein said second means comprises a periodicity measuring circuit having an input connected to an output of said first means, a latch circuit having an input connected to said periodicity measuring circuit, for delaying an output signal from said periodicity measuring circuit by a predetermined amount, a calculator having inputs connected to an output of said periodicity measuring circuit and an output of said latch circuit, for calculating a difference between the outputs of said periodicity measuring circuit and said latch circuit to provide a variation of periodicity of synchronizing signals, a second latch circuit having an input connected to an output of said calculator, for providing a delay of a predetermined amount, a comparator having inputs connected to said output of said calculator and an output of said second latch circuit, for comparing a current variation of synchronizing signal periodicity with a succeeding variation of synchronizing signal periodicity and a tracking direction setting circuit responsive to an output of said comparator for determining a changing direction of tracking and informing the changing direction to said tracking adjust means.

7. The auto-tracking system claimed in any of claims 1 to 3, further comprising fourth means for detecting an FM envelope of said video signal for a current signal field or frame and comparing it with an FM envelope of a preceding video signal obtained at a preceding field or frame and a switching circuit for connecting an output of said fourth means to said tracking adjust means to cause said servo means to successively change tracking by a predetermined amount such that the output level of said rotary heads is maximized based upon a result of said comparison in said fourth means and connecting an output of said second means to said tracking adjust means to cause said servo means to predetermined change tracking by the predetermined amount such that the periodicity variation is minimized after said comparison in said fourth means indicates equality.

8. The auto-tracking system claimed in claim 6, wherein said second means comprises a periodicity measuring circuit having an input connected to an output of said first means, a latch circuit having an input connected to said periodicity measuring circuit, for delaying an output signal from said periodicity measuring circuit by a predetermined amount, a calculator having inputs connected to an output of said periodicity measuring circuit and an output of said latch circuit, for calculating a difference between the outputs of said periodicity measuring circuit and said latch circuit to provide a variation of periodicity of synchronizing signals, a second latch circuit having an input connected to an output of said calculator, for providing a delay of a predetermined amount, a comparator having inputs connected to said output of said calculator and an output of said second latch circuit, for comparing a current variation of synchronizing signal periodicity with a succeeding variation of synchronizing signal periodicity, a tracking direction setting circuit responsive to an output of said comparator for determining a changing direction of tracking and informing the changing direction to said tracking adjust means and a circuit responsive to an absence of a synchronizing signal to cause said tracking direction setting circuit to fix the changing direction of tracking.

9. An auto-tracking system for a video tape recorder, comprising:

means for controlling a dynamic positional relationship between rotary video heads and a running magnetic tape into an optimum tracking position;

means for separating synchronizing signals in the video signals on the running magnetic tape reproduced via the rotary video head; and means for measuring a present cycle variation in the synchronizing signals corresponding to a present tracking position determined by said tracking control means, comparing the measured present cycle variation with a preceding cycle variation in the synchronizing signals corresponding to a preceding tracking position determined by said tracking control means and setting a tracking correction direction which reduces the cycle variation in the synchronizing signals based upon the comparison, said tracking control means enabling successive shifting of the tracking position by a predetermined amount in accordance with the tracking correction direction set by said measuring means until the cycle variation in the synchronizing signals is minimized to obtain the optimum tracking position.

* * * * *